P. F. WOBST.
RESILIENT TIRE.
APPLICATION FILED AUG. 6, 1912.
1,051,939.
Patented Feb. 4, 1913.
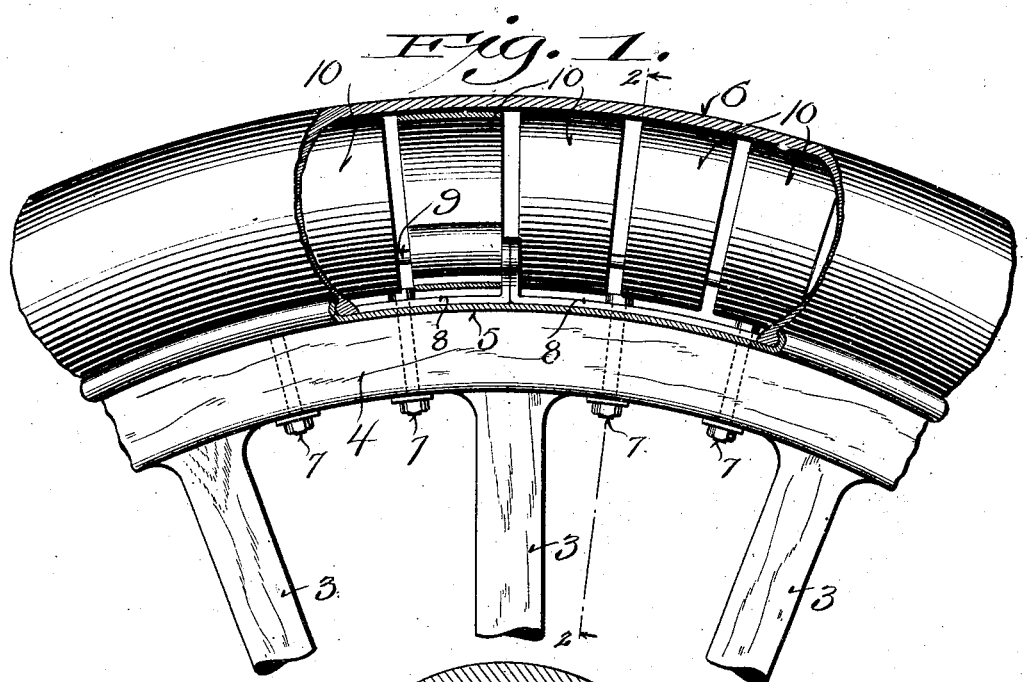
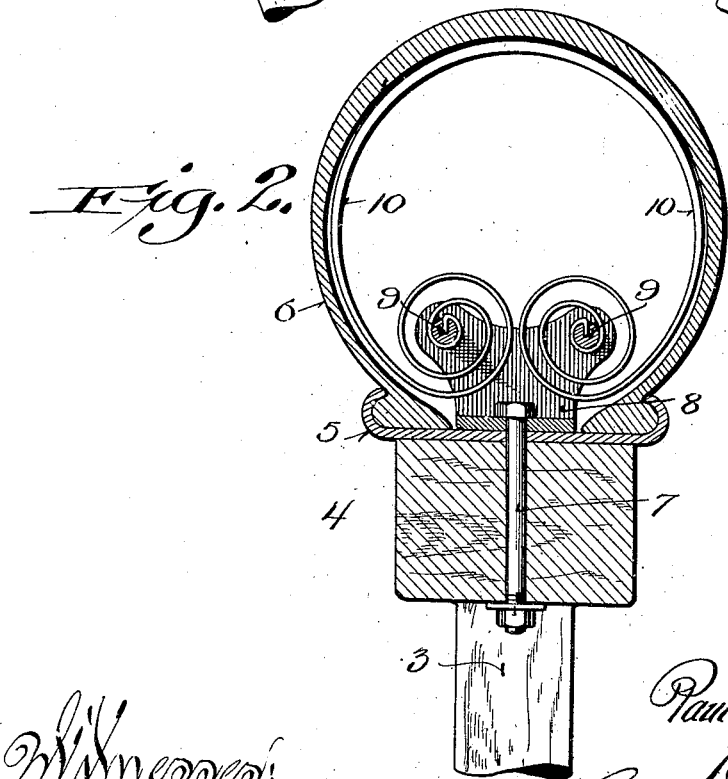

UNITED STATES PATENT OFFICE.

PAUL F. WOBST, OF MILWAUKEE, WISCONSIN.

RESILIENT TIRE.

1,051,939.  Specification of Letters Patent.  Patented Feb. 4, 1913.

Application filed August 6, 1912. Serial No. 713,604.

*To all whom it may concern:*

Be it known that I, PAUL F. WOBST, a citizen of the United States, and resident of Milwaukee, in the county of Milwaukee and State of Wisconsin, have invented certain new and useful Improvements in Resilient Tires; and I do hereby declare that the following is a full, clear, and exact description thereof.

My invention consists in what is herein particularly set forth with reference to the accompanying drawings and pointed out in the claims of this specification, its object being to provide simple, economical, durable and efficient non-pneumatic resilient tires for the wheels of automobiles and other vehicles.

Figure 1 of the drawings represents a partly sectional side elevation of a fragment of a resilient tire in accordance with my invention, and of a vehicle-wheel to which it is applied, and Fig. 2, a transverse sectional view indicated by line 2—2 in Fig. 1.

Referring by numerals to the drawings, 3 indicates spokes, and 4 a felly of a vehicle-wheel. Bolted to the felly is a clencher-rim 5, for a flexible casing 6 of any suitable material. Interposed between the rim 5 and heads of the bolts 7 are angular brackets 8 for the support of rods 9 concentric to said rim and sufficiently clear of the same. Each bracket is a plate of sheet-metal widened at the ends and punched out to provide eyes for the engagement of the rods 9, the eye-ends of the plate being outwardly bent at approximately right-angles to the remainder thereof—that is longitudinally of the rim to which it is fastened, and each rod is of a length sufficient to encompass the wheel. Engaging longitudinal grooves of the rods 9 or otherwise fastened thereto are the terminals of convoluted ends of spring metal bows 10 at suitable intervals apart within said casing tranversely of the same, the length of the brackets being preferably such that three or more of the springs are arranged between the ends of each.

In practice the spring-bows are sufficiently stiff in proportion to a predetermined maximum load that may come thereon, and incidental to yield of the same there is a winding of their convolute ends to automatically take up the slack.

I claim:

1. A resilient tire comprising a rim, a casing therewith, brackets secured to the rim longitudinally of the same and each consisting of a plate having widened outwardly bent ends at approximately right-angles to the remainder thereof, rim-encompassing rods extending through eyes provided in the ends of the brackets, and casing distending spring-bows having convolute ends fastened to the rods, the bows being transversely of said casing.

2. A resilient tire comprising a rim, brackets secured on the rim longitudinally of the same and having outwardly extending ends, a pair of rods extending through eyes provided in said ends of the brackets, each rod being of a length sufficient to encompass said rim, spring-bows having convolute ends fastened to the rods, and a casing inclosing said brackets, rods and bows, the bows being transversely of said casing distended thereon.

3. A resilient tire comprising a rim, brackets secured on the rim longitudinally of the same and having outwardly extending ends, a pair of rods extending through eyes provided in said ends of the brackets, each rod being longitudinally grooved and of a length sufficient to encompass said rim, spring-bows having terminals of convolute ends thereof caught in the grooves of the rods, and a casing inclosing said brackets, rods and bows, the bows being transversely of said casing distended thereon.

In testimony that I claim the foregoing I have hereunto set my hand at Milwaukee in the county of Milwaukee and State of Wisconsin in the presence of two witnesses.

PAUL F. WOBST.

Witnesses:
 WM. LEHMANN,
 GEORGE BEUSCHER.

---

Copies of this patent may be obtained for five cents each, by addressing the "Commissioner of Patents, Washington, D. C."